J. A. GARDNER.
COTTON PLANTER.
APPLICATION FILED SEPT. 24, 1918.

1,319,952.  Patented Oct. 28, 1919.

Witness  
Inventor  
John A. Gardner  
By  
Attorney

UNITED STATES PATENT OFFICE.

JOHN A. GARDNER, OF GRIFTON, NORTH CAROLINA.

COTTON-PLANTER.

1,319,952.   Specification of Letters Patent.   Patented Oct. 28, 1919.

Application filed September 24, 1918. Serial No. 255,428.

*To all whom it may concern:*

Be it known that I, JOHN A. GARDNER, a citizen of the United States, residing at Grifton, in the county of Pitt and State of North Carolina, have invented certain new and useful Improvements in Cotton-Planters, of which the following is a specification, reference being had therein to the accompanying drawing.

This invention relates to improvements in seed planters, and has special reference of a cotton planter, one object of the invention being the provision of means whereby the cotton seed may be drilled or dropped for hill planting, as desired, and by means of which the distributing opening may be adjusted.

A further object of this invention is the provision of a hopper and mechanism which can be interchanged with the hopper and mechanism, shown in my co-pending application for seed planter filed even date herewith, Serial No. 255,427, thus providing a machine with two hoppers, and with which all characters of seed may be planted, such as corn, cotton, beans, peas and peanuts.

In the accompanying drawings:—

Figure 1:
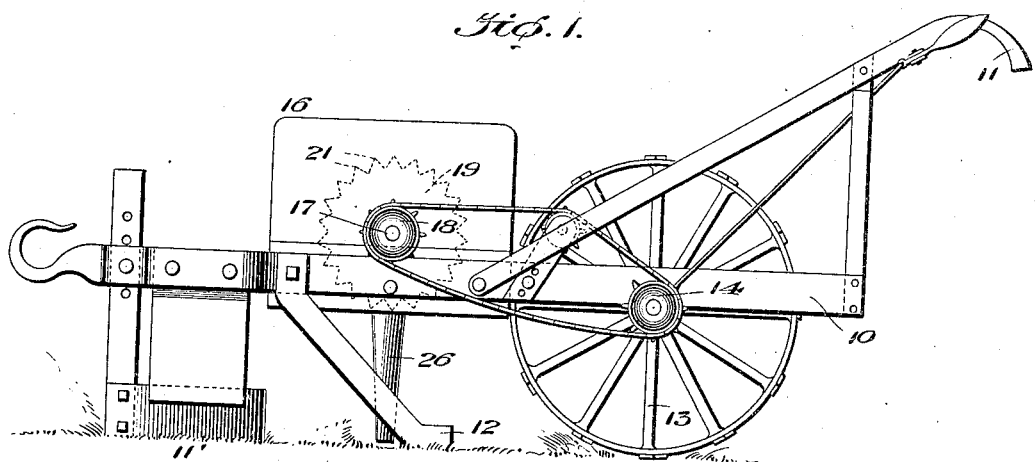
Figure 1 is a side elevation of the complete planter.
Figure 2:
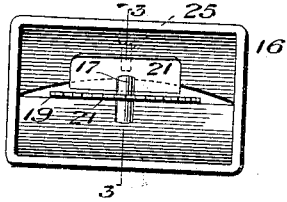
Fig. 2 is a top plan view of the hopper *per se.*
Figure 3:
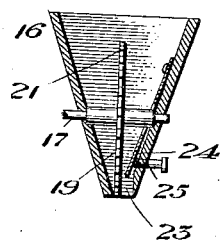
Fig. 3 is a section on line 3—3 of Fig. 2.
Figure 4:
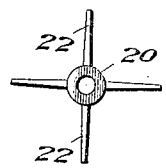
Fig. 4 is a plan view of another type of distributing disk interchangeable with this planter for hill planting.

Referring to the drawings, the numeral 10 designates the frame of the planter, having the guiding handles 11, the furrow opener 11', the covers 12, and the corrugating tractor wheel 13. The sprocket 14 is driven by the wheel 13, as will presently appear, and through the chain, drives the planting mechanism.

The hopper 16 is detachably mounted in the frame, and is provided with the single cross shaft 17, carrying the sprocket 18, operated by the chain. This shaft is so constructed as to be readily removed for the attachment thereto of the drilling member 19 or the hilling member 20.

The member 19 is a disk with a plurality of peripherial teeth 21, while the member 20 is provided with the fingers 22.

The hopper is provided with the outlet opening 23, while mounted adjacent thereto in a spring plate 24, having the free depending edge, disposed to be moved to or from the member 19 or 20, by means of the set screw 25. By this means the size of the outlet is regulated, so that the quantity of seed to be fed to the outlet spout 26 is regulated.

From the foregoing description taken in conjunction with the drawings it is evident that a seed planter constructed according to and embodying this invention will plant cotton seed in drills and hills, according to the desire of the farmer.

What I claim, as new, is:—

1. In a cotton planter, a hopper having a seed outlet, a substantially flat radial toothed disk mounted in the hopper with the periphery thereof adjacent the outlet, a spring plate mounted in the hopper also adjacent the outlet, with its free end opposed to the body of the disk, and adjustable means for moving the free end toward the disk to regulate the outlet space between the plate and disk.

2. In a cotton planter, a hopper having a seed outlet, a substantially flat toothed disk mounted in the hopper with its periphery adjacent the outlet thereof, a toothed plate having one edge secured to one wall of the hopper and the other edge disposed adjacent the body of the disk, said lower edge being straight and extending substantially the full width of the disk at that point, and adjusting means mounted in the wall of the hopper adjacent the free end of the plate for moving the free end of the plate toward the disk.

In testimony whereof I affix my signature.

JOHN A. GARDNER.

Copies of this patent may be obtained for five cents each, by addressing the "Commissioner of Patents, Washington, D. C."